(12) United States Patent
Phillips et al.

(10) Patent No.: US 9,243,539 B2
(45) Date of Patent: Jan. 26, 2016

(54) CATALYST COMPOSITION

(71) Applicant: JOHNSON MATTHEY PUBLIC LIMITED COMPANY, London (GB)

(72) Inventors: Paul Richard Phillips, Royston (GB); Agnes Suganya Raj, Reading (GB); Raj Rao Rajaram, Slough (GB)

(73) Assignee: Johnson Matthey Public Limited Company, London (GB)

( * ) Notice: Subject to any disclaimer, the term of this patent is extended or adjusted under 35 U.S.C. 154(b) by 201 days.

(21) Appl. No.: 13/912,248

(22) Filed: Jun. 7, 2013

(65) Prior Publication Data

US 2013/0333362 A1  Dec. 19, 2013

Related U.S. Application Data

(60) Provisional application No. 61/661,607, filed on Jun. 19, 2012.

(30) Foreign Application Priority Data

Jun. 20, 2012  (GB) .................................. 1210891.6

(51) Int. Cl.
| | | |
|---|---|---|
| *B01D 50/00* | (2006.01) | |
| *F01N 3/28* | (2006.01) | |
| *B01J 23/66* | (2006.01) | |
| *B01J 37/03* | (2006.01) | |
| *B01J 23/52* | (2006.01) | |
| *B01D 53/94* | (2006.01) | |

(52) U.S. Cl.
CPC ............. *F01N 3/2807* (2013.01); *B01D 53/945* (2013.01); *B01J 23/52* (2013.01); *B01J 23/66* (2013.01); *B01J 37/035* (2013.01); *B01D 2255/106* (2013.01); *B01D 2255/1023* (2013.01); *B01D 2255/2065* (2013.01); *B01D 2255/2073* (2013.01); *B01D 2255/2092* (2013.01); *B01D 2255/2094* (2013.01); *B01D 2255/20707* (2013.01); *B01D 2255/20715* (2013.01); *B01D 2255/20738* (2013.01); *B01D 2255/20746* (2013.01); *B01D 2255/20761* (2013.01); *B01D 2255/30* (2013.01); *B01D 2255/50* (2013.01); *B01D 2258/012* (2013.01); *Y02T 10/22* (2013.01)

(58) Field of Classification Search
CPC .................. B01D 2255/106; B01D 2255/2073; B01D 2255/30; B01D 2258/012; F01N 3/2807; B01J 23/52
USPC ............. 422/177, 180, 168; 60/299; 502/304, 502/328, 243
See application file for complete search history.

(56) References Cited

U.S. PATENT DOCUMENTS

| | | | |
|---|---|---|---|
| 5,347,046 A  * | 9/1994 | White et al. ................... | 560/245 |
| 5,473,887 A | 12/1995 | Takeshima et al. | |
| 5,505,921 A | 4/1996 | Lückoff et al. | |
| 2008/0125308 A1 | 5/2008 | Fujdala et al. | |
| 2009/0093653 A1 | 4/2009 | Mayer et al. | |
| 2010/0273644 A1 | 10/2010 | Hagemeyer et al. | |

FOREIGN PATENT DOCUMENTS

| | | |
|---|---|---|
| CN | 101698149 A | 4/2010 |
| EP | 0602865 A1 | 6/1994 |
| EP | 0766993 A2 | 4/1997 |
| GB | 2122912 A | 1/1984 |
| JP | 2009011951 A | 1/2009 |
| WO | 0180978 A1 | 11/2001 |
| WO | 2004025096 A1 | 3/2004 |
| WO | 2009136206 A1 | 11/2009 |
| WO | 2010090841 A2 | 8/2010 |

OTHER PUBLICATIONS

UK Search Report dated Oct. 8, 2012 for corresponding GB1210891.6 filed Jun. 20, 2012.

* cited by examiner

*Primary Examiner* — Tom P Duong
(74) *Attorney, Agent, or Firm* — Gary D. Mangels

(57) ABSTRACT

A catalyst composition comprises a mixed metal catalyst which comprises unalloyed palladium and palladium-gold alloy disposed on a support, wherein the palladium-gold alloy is enriched in gold and at least one promoter in which said promoter comprises at least one reducible metal oxide.

18 Claims, 3 Drawing Sheets

CATALYST COMPOSITION

CROSS-REFERENCE TO RELATED APPLICATION

This application claims priority benefit to U.S. Provisional Patent Application No. 61/661,607 filed on Jun. 19, 2012, and Great Britain Patent Application No. 1210891.6 filed on Jun. 20, 2012, both of which are incorporated herein by reference.

FIELD OF THE INVENTION

The present invention relates to a catalyst composition for treating exhaust gases emitted from internal combustion engines, especially lean burn internal combustion engines, such as a diesel engine. In particular, the present invention relates to a catalyst composition for oxidising exhaust gas components including carbon monoxide (CO) and hydrocarbons (HCs).

BACKGROUND TO THE INVENTION

Carbon dioxide is one of the main gaseous emissions from the combustion process within an internal combustion engine. It is considered by many in the scientific community to be a major factor in global warming as a result of increase of greenhouse effect due to its emissions. Currently in Europe there are no mandatory emission standards for carbon dioxide emitted from passenger cars, but voluntary agreements with motor manufacturers are in place. In the UK financial measures have been introduced in 2001 in an attempt to lower carbon dioxide emissions by linking vehicle excise duty to carbon dioxide emission levels and type of fuel used. Therefore passenger car buyers pay lower annual vehicle excise duty for vehicles that emit lower levels of carbon dioxide.

However the European Union has now agreed a mandatory carbon dioxide target for passenger car manufacturers. Under this legislation car manufacturers have a fleet average emissions target for vehicles sold in Europe of 130 g $CO_2$/km or below by 2015. This target is being gradually phased in from 2012. The US also recognises that the running of vehicles provides a major source of carbon dioxide emissions. Greenhouse Gas (GHG) emission standards have been set by the Environmental Protection Agency (EPA) and National Highway Traffic Safety Administration (NHTSA). These reductions are being phased in from 2009 to 2016 and are defined in terms of $CO_2$— equivalents (g $CO_2$/mile) whereby emissions of $N_2O$ and $CH_4$ are included with multiplying factors of 296 and 23 respectively.

Therefore car manufacturers are striving to lower their carbon dioxide emissions by a variety of measures such as weight reduction, variable valve actuation, low friction components and stop-start technologies. By adopting such measures a reduction in $CO_2$ emissions of 25-30% is reportedly achievable. Many of these measures will also lead to a reduction in the exhaust gas temperature because of the improved fuel efficiency.

The combustion process in the internal combustion engine of a vehicle is never perfect. Harmful emissions that result from the incomplete combustion are carbon monoxide, unburned hydrocarbons and $NO_x$. There are existing and future emission standards for such gaseous emissions. Carbon monoxide and hydrocarbons are typically removed from the exhaust gas of the internal combustion engine by use of an oxidation catalyst as part of a catalytic convertor. In simple terms a catalytic convertor needs to provide a structure that exposes a maximum surface area of catalyst to the exhaust gas stream and the catalyst needs to aid the reaction of the carbon monoxide and hydrocarbons with oxygen in the exhaust gas stream. Also the cost of the catalyst must be minimised, for example by using less and/or using less expensive materials.

Catalysts that have been used most successfully for oxidation reactions in catalytic convertors are precious metals, specifically platinum, which is a very expensive material. Palladium has been combined with platinum to reduce the catalyst costs and also has been found to reduce sintering of the platinum at higher temperatures. However palladium itself is known to have lower reactivity under very oxidising (lean oxidising) conditions relative to platinum. Unlike platinum, which has a higher ionisation potential and lower oxide stability, palladium exists mostly as an oxide with low specific activity for the oxidation of carbon monoxide and hydrocarbons.

Palladium is also known for its ability to react with sulphur dioxide, present in diesel exhaust gases, to form a stable sulphate which requires high temperatures to decompose. The decomposition of palladium sulphate in a lean environment requires temperatures in excess of 700° C. or lower temperatures in rich fuel gas exhaust but then there is a fuel penalty because of the creation of the rich environment. Although there have been moves across the world to reduce the level of sulphur present in diesel fuel (currently the mandatory level in Europe is 10 ppm) sulphur poisoning of exhaust gas catalysts is still an issue.

WO2010/090841 A1 discloses preparation of a palladium gold catalyst which is supported on alumina. The palladium and gold particles are described as being "in close contact". There is no mention of whether they are or can be present as an alloy. Pd—Au (wt % Au—Pd of ~1:1.5) on alumina were exposed to a gas mixture having the composition: 1000 ppm CO, 225 ppm propene, 105 ppm propene, 450 ppm NO, 10% $O_2$ and He balance and heated to 673 K at 10K/min. FIGS. 7A-B and 8A-8B show the oxidation profiles of carbon monoxide and propene respectively with light off temperatures which all seem to be above 150° C. It appears that the choice of metal oxide support for the Pd and Au particles has not been deemed important to the optimisation of the catalyst activity nor is the formation of the alloy between the particles.

WO2009/136206 A1 discloses an exhaust system for lean-burn internal combustion comprising a Pd—Au alloy catalyst on a metal oxide support. There is no disclosure in the patent specification of possible types of metal support but alumina is used in all the Examples. A variety of catalysts were exposed to a gas mixture having the composition 1000 ppm CO, 900 ppm hydrocarbon, 200 ppm NO, 2 ppm $SO_2$, 12% $O_2$, 4.5% $CO_2$, 4.5% $H_2O$ and $N_2$ balance. Data for a variety of Au:Pd ratios show temperatures for 80% carbon monoxide conversion and temperatures for 50% hydrocarbon conversion of at least 150° C.

EP 0602865 A1 discloses noble metal-metal oxide catalysts prepared by co-precipitation and their use to catalyse the oxidation of carbon monoxide and hydrocarbons in internal combustion engine exhaust gas. The metal oxide comprises one or more of ceria, zirconia, titania or stannic oxide with ceria being especially preferred. Noble metals disclosed include one or more of ruthenium, rhodium, palladium, osmium, iridium, platinum and gold. It is disclosed in the specification that catalysts tested on simulated car gas exhaust which is rich of stoichiometric at a lambda value of 0.98 convert one or more of a) 50% CO at a temperature lower than 250° C., preferably lower than 150° C. b) 50% of nitrogen monoxide at a temperature lower than 300° C., preferably lower than 250° C. and c) 50% of hydrocarbons present as propene at a temperature lower than 350° C., preferably lower than 300° C. The Examples disclosed include Pd-ceria, Pt-ceria, Pd—Pt-ceria, Pd—Pt-ceria-alumina, Pt-stannic oxide and Au-zirconia.

WO2004/025096 A1 discloses a supported palladium catalyst for homogeneous charge compression ignition diesel engine (HCCI). This engine differs from a conventional direct injection diesel engine in that all fuel for combustion is injected into the combustion chamber prior to the start of combustion. Such engines were found to produce high levels of CO and relatively high levels of HC on combustion compared to conventional direct injection diesel engines. The examples show temperature of conversion for a variety of catalysts according to the invention for exhaust gas emissions from both HCCI and direct injection diesel engines. For direct injection engines Pt-alumina was superior to Pd-ceria for low temperature conversion of both CO and HC (Example 1).

SUMMARY OF THE INVENTION

We have now identified a family of supported catalysts that are capable of converting both CO and HC present in the exhaust gas stream from conventional lean burn internal combustion engines at low temperatures whilst also providing resistance to high temperature excursion and having the ability to be readily desulphated without adversely affecting the CO and HC conversion rate.

According to a first aspect, the invention provides a catalyst composition comprising a mixed metal catalyst which comprises unalloyed palladium and palladium-gold alloy disposed on a support, and at least one promoter in which said promoter comprises at least one reducible metal oxide. Typically, the palladium-gold alloy is enriched in gold.

A second aspect of the invention provides a process for preparing a catalyst composition comprising a mixed metal catalyst which comprises unalloyed palladium and palladium-gold alloy disposed on a support, and at least one promoter in which said promoter comprises at least one reducible metal oxide which process comprises deposition of a solution of metal salts of the mixed metal catalyst on to a slurry of at least one promoter and support, where the promoter and support may be the same or different, controlled at a pH of between 6 and 8, followed by washing, drying and calcining of the resultant precipitate. The palladium-gold alloy is typically enriched in gold.

A third aspect of the invention provides a method for reducing the light off temperature of carbon monoxide and/or hydrocarbons, which method comprises passing exhaust gas through a catalyst composition according to the first aspect of the invention.

A fourth aspect of the invention provides a catalytic convertor comprising a substrate monolith coated with a catalyst composition comprising a supported mixed metal catalyst which comprises unalloyed palladium and palladium-gold alloy, and at least one promoter in which said promoter comprises at least one reducible metal oxide. Typically, the palladium-gold alloy is enriched in gold. In general, the fourth aspect relates to a catalytic convertor comprising a substrate monolith coated with a catalyst composition of the first aspect of the invention.

In a fifth aspect, the invention provides a lean burn internal combustion engine exhaust gas emission treatment system comprising a catalytic convertor comprising a substrate monolith coated with a catalyst composition comprising a mixed metal catalyst which comprises unalloyed palladium and palladium-gold alloy disposed on a support, and at least one promoter in which said promoter comprises at least one reducible metal oxide. Typically, the palladium-gold alloy is enriched in gold. The fifth aspect of the invention generally relates to an exhaust gas treatment system comprising the catalytic convertor of the fourth aspect of the invention.

A sixth aspect of the invention provides an apparatus comprising a lean burn internal combustion engine and a lean burn internal combustion engine exhaust gas emission treatment system according to the fifth aspect of the invention.

A seventh aspect of the invention provides a vehicle including an apparatus according to the sixth aspect of the invention.

In an eighth aspect, the invention provides to a method of treating an exhaust gas from or produced by a lean burn internal combustion engine, which method comprises contacting the exhaust gas with a either catalyst composition according to the first aspect of the invention, a catalytic convertor according to the fourth aspect of the invention or a lean burn internal combustion engine exhaust emission treatment system according to the fifth aspect of the invention. This aspect of the invention also relates to the use of either (i) the catalyst composition according to the first aspect of the invention, (ii) the catalytic convertor according to the fourth aspect of the invention or (iii) the lean burn internal combustion engine exhaust emission treatment system for treating an exhaust gas from or produced by a lean burn internal combustion engine.

DETAILED DESCRIPTION OF THE INVENTION

Figure 1:
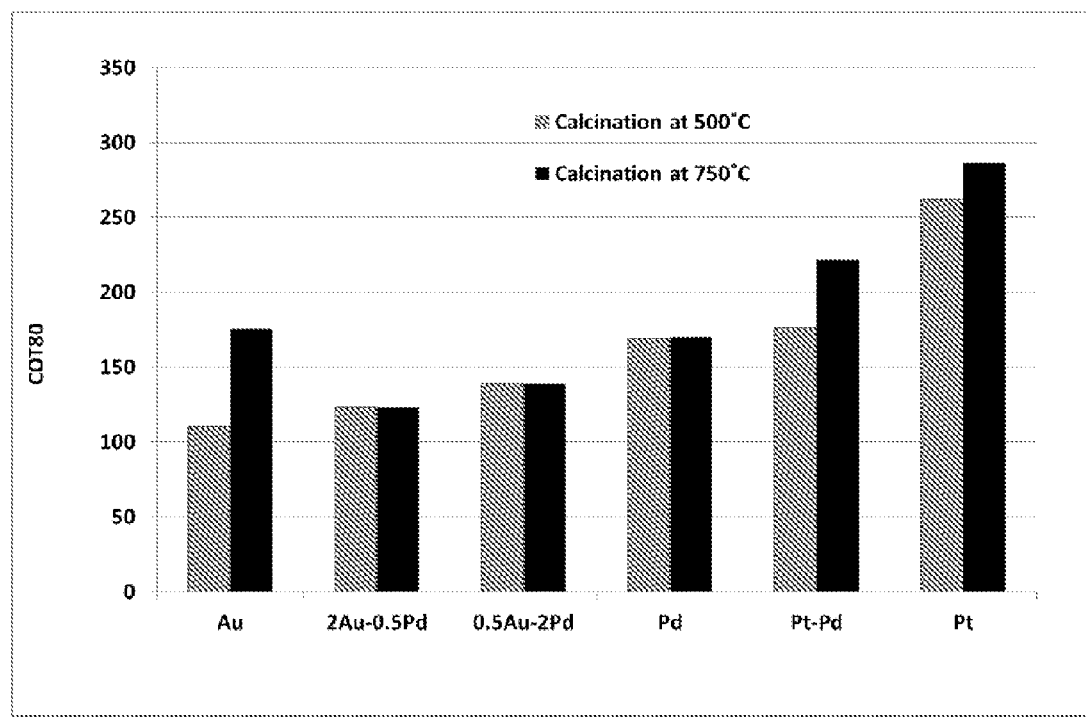
FIG. 1 is a chart showing the temperature at which 80% CO conversion occurs plotted for a range of catalyst compositions according to the invention and a range of reference catalyst compositions which have been subjected to thermal ageing.

Gold is a precious metal, which depending on the prevailing economic situation can be cheaper than platinum. It is a noble metal with more "metallic" qualities than palladium, i.e. similar to platinum. When alloyed with palladium, it can make palladium more metallic, e.g. less likely to form PdO.

Typically, the atomic ratio of Pd:Au in the mixed metal catalyst (e.g. the supported mixed metal catalyst) is from 100:1 to 1:100, preferably from 95:5 to 5:95 (e.g. 95:5 to 80:20 or 20:80 to 5:95), more preferably from 95:5 to 25:75.

In general, the weight ratio of Pd:Au in the mixed metal catalyst is >1:1. It is preferred that the weight ratio of Pd:Au in the mixed metal catalyst is >3:1, more preferably >3.5:1.

The amount of Au and Pd (i.e. total Au and Pd) in the mixed metal catalyst (e.g. the supported mixed metal catalyst having at least one reducible metal oxide promoter) is typically from 0.5 to 10 wt %, preferably 1 to 5 wt %. In general, the amount is based on the total weight of the support and supported metal. The at least one promoter comprises at least one reducible metal oxide.

Typically, the at least one reducible metal oxide is at least one oxide of manganese ($MnO_2$ and $Mn_2O_3$), iron ($Fe_2O_3$), tin ($SnO_2$), copper (CuO), cobalt (CoO and $Co_2O_3$), titanium ($TiO_2$) or cerium ($CeO_2$). It is preferred that the at least one reducible metal oxide is at least one oxide of iron (e.g. $Fe_2O_3$) or cerium (e.g. $CeO_2$), with the at least one oxide of ceria (e.g. $CeO_2$) being especially preferred. Alternatively, the at least one reducible metal oxide may be at least one oxide of tin ($SnO_2$), copper (CuO) or cobalt (CoO and $Co_2O_3$).

Reducible metal oxides are versatile solid state compounds that exhibit a rich chemistry related to changes in the oxidation state of the metal. For example $CeO_2$ is able to undergo rapid and reversible $Ce^{4+}/Ce^{3+}$ redox cycles depending on the conditions in the exhaust gas emission stream. When there is a shortage of oxygen $CeO_2$ is reduced by reacting with CO to form $Ce_2O_3$ and when there is an oxygen surplus $Ce_2O_3$ is oxidised to $CeO_2$. Ceria (cerium dioxide) is known to be thermally stable but it is susceptible to sulphur poisoning.

In general, the particle size of the reducible metal oxide is typically up to 50 nm, preferably in the range of 1 to 25 nm (e.g. as determined by conventional laser diffraction techniques).

The reducible metal oxide can be dispersed or supported on a particulate metal oxide (e.g. a particulate metal oxide support). Additionally or alternatively, the support can comprise, or consist of, a reducible metal oxide, such as a particulate reducible metal oxide (e.g. a particulate bulk reducible oxide). The support material usually has a high surface area. Metal oxides may be used because of their generally high thermal and chemical stability.

Typically, the support or the particulate metal oxide support comprises, or consists of, alumina, magnesia, silica-alumina, zirconia, a zeolite or a mixture, composite oxide or mixed oxide of any two or more thereof, and optionally can be doped. It can be doped with a dopant, which is a basic metal selected from zirconium, lanthanum, aluminium, yttrium, praseodymium, cerium, barium and neodymium. Typically, the dopant is present at 1-10 wt % of the support.

The support, in general, may be the reducible metal oxide and/or promoter (i.e. the reducible metal oxide/promoter per se), such as a reducible metal oxide as mentioned hereinabove.

In one general embodiment, the support or the particulate metal oxide support does not comprise or consist of alumina, particularly a lanthanum stabilised alumina. Preferably, the mixed metal catalyst is not disposed on a support comprising or consisting of alumina, such as a lanthanum stabilised alumina.

Generally, the mixed metal catalyst may be supported on particulate ceria. The ceria may be both the promoter and the support.

The reducible metal oxide may be a mixed oxide comprising or with a stabiliser (i.e. the reducible metal oxide is combined with a stabiliser to form the mixed oxide), such as a refractory metal or oxide thereof (e.g. zirconium or zirconia). When the reducible metal oxide is a mixed oxide, then it may be selected from manganese oxide with zirconium and ceria with zirconium. The molar ratio of the reducible metal oxide to zirconium is preferably 10:1 to 1:10.

Alternatively the reducible metal oxide may be a composite or mixed oxide comprising or with a refractory oxide (i.e. the reducible metal oxide is combined with a refractory oxide). The refractory oxide may be selected from alumina, magnesia, silica-alumina and zirconia. The weight ratio of the reducible metal oxide to the refractory oxide is typically 3:1 to 1:3.

The catalyst composition may comprise platinum. Pt is more tolerant than Pd to sulphur. This may enable the catalyst composition as a whole to be desulphated more effectively at lower temperature.

Typically, the catalyst composition further comprises platinum, wherein the platinum is located on a separate (e.g. separate and distinct support, such as a metal oxide support) from the mixed metal catalyst disposed on a support (e.g. the supported mixed metal catalyst with at least one promoter according to the first aspect of the invention). The support for platinum may be a support as defined above. It is preferred that the support for the platinum is different (e.g. has a different composition) to the support for the mixed metal catalyst.

When the catalyst composition comprises platinum, then preferably the platinum is combined with palladium (more preferably as an alloy, such as a platinum-palladium alloy). Combining the platinum with palladium may improve the sintering resistance of the platinum.

The platinum and palladium components of the catalyst composition may be arranged in a variety of ways.

The mixed metal catalyst may be on (e.g. supported on) a first reducible metal oxide (e.g. acting as a combined support and promoter) and the platinum (and optional palladium) is on (e.g. supported on) a second metal oxide support, wherein both the mixed metal catalyst and the platinum are disposed in the same washcoat region, preferably the same washcoat layer.

The platinum (and optional palladium) may be on (e.g. supported on) a second metal oxide support, which is located in a zone (e.g. a first zone) of a substrate monolith upstream of a zone (e.g. a second zone) comprising the mixed metal catalyst on (e.g. supported on) the reducible metal oxide. The reducible metal oxide is the support and promoter.

The platinum (and optional palladium) on (e.g. supported on) a second metal oxide support may be disposed in a layer, which layer is under an overlayer comprising the mixed metal catalyst on (e.g. supported on) a first reducible metal oxide (i.e. the first reducible metal oxide is the support and promoter). The layer under the overlayer is preferably disposed directly onto the substrate monolith.

Generally, the mixed metal catalyst may be supported on a mixed oxide or composite oxide of particulate ceria with alumina. The particulate ceria with alumina (e.g. ceria-alumina) may be both the promoter and the support.

The catalyst composition of the invention does not, in general, comprise an alkali metal acetate.

The second aspect of the invention relates to a process for preparing a catalyst composition. The catalyst composition of the invention may be prepared by a conventional impregnation technique, such as that disclosed in GB2122912 A, co-precipitation, such as that disclosed in EP0602865 A, or deposition/precipitation. It is preferred that the catalyst composition is prepared by deposition/precipitation of a solution of catalyst metal salts onto a slurry of at least one promoter and support, where the promoter and support may be the same or different, controlled at a pH of between 6 and 8. The resultant precipitate is washed, dried and calcined.

The third aspect of the invention relates to a method for reducing the light off temperature of carbon monoxide and/or hydrocarbons.

A typical direct injection light duty diesel fuelled engine produces approximately 1000 ppm CO and 900 ppm HC at an exhaust gas emission temperature of about 185° C.

Catalyst compositions according to the invention were tested for CO and HC light off in a flowing gas mixture having the above specified concentrations of CO and HC in a simulated catalyst activity test (SCAT) gas apparatus. Catalyst compositions according to the invention tested in the SCAT gas apparatus preferably have CO light off (temperature at 80% CO conversion) of less than 180° C., more preferably less than 150° C. and HC light off (temperature at 80% HC conversion) of preferably less than 200° C., more preferably less than 180° C. For 50% CO conversion and 50% HC conversion the light off temperatures are preferably less than 150° C., more preferably less than 130° C. for CO and preferably less than 190° C. more preferably less than 180° C. for HC.

Conventional direct injection diesel engines can produce exhaust gas emissions comprising up to and greater than 2000 ppm carbon monoxide at cold start as part of the warm up strategy. Also such levels of CO may be produced during hard acceleration. Catalyst compositions according to the invention are effective in converting these high levels of CO when present in the exhaust gas emissions. Catalyst compositions according to the invention tested in the SCAT gas apparatus with CO levels of up to 2000 ppm have CO light off (temperature at 80% CO conversion) of preferably less than 180° C., more preferably less than 150° C. For 50% CO conversion the light off temperature is preferably less than 150° C., more preferably less than 130° C.

Typically the catalyst composition has a temperature for 80% carbon monoxide conversion of less than 180° C., preferably less than 150° C., when fresh catalyst composition is exposed to a flowing gas mixture which mimics conventional direct injection diesel engine emissions in a simulated catalyst activity test gas apparatus in the presence of up to 2000 ppm carbon monoxide.

The catalyst composition of the invention may have a temperature for 80% carbon monoxide conversion of less than 180° C., preferably less than 150° C., after the catalyst composition has been aged at 500° C. for 2 hr or 600° C. for 2 hr, and when it is exposed to a flowing gas mixture which mimics conventional direct injection diesel engine emissions in a simulated catalyst activity test gas apparatus.

The catalyst composition of the invention may have a temperature for 80% carbon monoxide conversion of less than 180° C., after the catalyst composition has been subjected to sulphation and desulphation processes, and when it is exposed to a flowing gas mixture which mimics conventional direct injection diesel engine emissions in a simulated catalyst activity test gas apparatus.

Generally, the catalyst composition has a temperature for 80% carbon monoxide conversion of less than 180° C., preferably less than 150° C. when fresh catalyst composition is exposed to a flowing gas mixture which mimics conventional direct injection diesel engine emissions in a simulated catalyst activity test gas apparatus.

Furthermore the presence of such high CO levels does not compromise the effectiveness of the catalyst for HC conversion. In fact the light off temperature for HC is significantly reduced as the amount of CO present in the exhaust gas system increases. Catalyst compositions according to the invention tested in the SCAT gas apparatus with HC levels of up to 2000 ppm have HC light off (temperature at 80% HC conversion) of preferably less than 180° C., more preferably less than 150° C.

Catalyst compositions of the invention are thermally stable such that the conversion of CO and HC is not adversely affected as the catalyst compositions ages. Catalyst compositions according to the invention, which have been aged by heating at 500° C. for 2 hrs and then at 750° C. for 10 hrs and tested in the SCAT gas apparatus using the conditions as described for fresh catalysts have CO light off (temperature at 80% CO conversion) of preferably less than 180° C., more preferably less than 150° C.

Catalyst compositions of the invention are tolerant to sulphation and desulphation processes. Desulphation can be readily achieved by contacting the catalyst compositions with exhaust gas at elevated temperatures. Furthermore the conversion of CO and HC is not adversely affected by repeated sulphation and desulphation. When exposed to a flowing gas mixture which mimics conventional direct injection diesel engine emissions with the addition of $SO_2$ in a concentration sufficient to provide about 10 mg S per g catalyst composition the light off temperature for 80% CO conversion was preferably less than 180° C.

The catalyst composition of the invention may have a temperature for 80% hydrocarbon conversion of less than 200° C., preferably less than 180° C., when fresh catalyst composition is exposed to a flowing gas mixture which mimics conventional direct injection diesel engine emissions in a simulated catalyst activity test gas apparatus.

Typically, the catalyst composition has a temperature for 80% hydrocarbon conversion monoxide of less than 200° C., preferably less than 180° C., when fresh catalyst composition is exposed to a flowing gas mixture which mimics conventional direct injection diesel engine emissions in a simulated catalyst activity test gas apparatus in the presence of up to 2000 ppm carbon.

As can be seen in the Examples and the accompanying Figures, the 2 wt % Au-0.5 wt % $Pd/CeO_2$ catalyst of the present invention has a slightly better $COT_{80}$ and $COT_{70}$ fresh, aged, sulphated and desulphated activity than the 0.5 wt % Au-2 wt % $Pd/CeO_2$ catalyst of the invention in synthetic catalytic activity test (SCAT) gas apparatus tests. However, in recent and preliminary tests on a vehicular light-duty diesel engine it appears that in a full gas mixture the activity of the 0.5 wt % Au-2 wt % $Pd/CeO_2$ catalyst composition is better than the 2 wt % Au-0.5 wt % $Pd/CeO_2$ catalyst composition.

In the fourth aspect of the invention, the substrate monolith of the catalytic convertor can be a flow-through monolith (e.g. a honeycomb flow-through monolith) or a filter (e.g. a filtering monolith). The filter can be full filter (typically known as a wall-flow filter) or a partial filter as known in the art (see e.g. WO 01/080978).

The flow-through monolith (e.g. a honeycomb flow-through monolith) or a filter (e.g. a filtering monolith) can be metallic or ceramic.

A flow-through monolith typically comprises a honeycomb monolith (e.g. a metal or ceramic honeycomb monolith) having a plurality of channels extending therethrough, which channels are open at both ends. When the substrate monolith is a flow-through monolith, then the catalytic convertor of the invention is typically a diesel oxidation catalyst (DOC) or is for use as a diesel oxidation catalyst (DOC).

A filter or filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate monolith is a filtering monolith, then the catalytic convertor of the invention is typically a catalysed soot filter (CSF) or is for use as a catalysed soot filter (CSF).

When the substrate monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate monolith may be of any shape or size. However, the shape and size of the substrate monolith is usually selected to optimise exposure of the catalyst composition to the exhaust gas. The substrate monolith may, for example, have a tubular, fibrous or particulate form. Examples of suitable supporting substrate monoliths include a substrate monolith of the honeycomb cordierite type, a substrate monolith of the honeycomb SiC type, a substrate monolith of the layered fibre or knitted fabric type, a substrate monolith of the foam type, a substrate monolith of the cross-flow type, a substrate monolith of the metal wire mesh type, a substrate monolith of the metal porous body type and a substrate monolith of the ceramic particle type.

The catalytic convertor of the invention is typically for use as a diesel oxidation catalyst (DOC) or a catalysed soot filter (CSF).

In a fifth aspect, the invention provides a lean burn internal combustion engine exhaust gas emission treatment system. The exhaust gas emission treatment system comprises the catalytic convertor and an emissions control device. In general, the emissions control device is separate to the catalytic convertor (e.g. the emissions control device has a separate substrate monolith to the substrate monolith of the catalytic convertor), and preferably the catalytic convertor is upstream of the emissions control device.

The emissions control device may be selected from a diesel particulate filter (DPF), a NO adsorber catalyst (NAC), a lean NO catalyst (LNC), a selective catalytic reduction (SCR) catalyst, a diesel oxidation catalyst (DOC), a catalysed soot filter (CSF), a selective catalytic reduction filter (SCRF) catalyst, and combinations of two or more thereof. Emissions control devices represented by the terms diesel particulate filters (DPFs), NO adsorber catalysts (NACs), lean NOx catalysts (LNCs), selective catalytic reduction (SCR) catalysts, diesel oxidation catalyst (DOCs), catalysed soot filters (CSFs) and selective catalytic reduction filter (SCRF) catalysts are all well known in the art.

Examples of emissions control devices for use with the catalytic convertor of the invention or for inclusion in the exhaust gas emission treatment system of the invention are provided below.

A diesel particulate filter is an emissions control device having a filtering substrate. The diesel particulate filter preferably comprises a substrate, wherein the substrate monolith is a filtering monolith or a flow-through monolith as defined above, preferably a filtering monolith. The substrate monolith may be coated with a catalyst composition.

The catalyst composition of the diesel particulate file may be suitable for oxidising (i) particulate matter (PM) and/or (ii) carbon monoxide (CO) and hydrocarbons (HCs). When the catalyst composition is suitable for oxidising PM, then the resulting emissions control device is known as a catalysed soot filter (CSF). A catalysed soot filter (CSF) is also an emissions control device having a filtering substrate. Typically, the catalyst formulation of a CSF comprises platinum and/or palladium.

The catalyst composition of the diesel particulate filter may be a $NO_x$ adsorber composition. When the catalyst composition is a $NO_x$ adsorber composition, the emissions control device is an example of a $NO_x$ adsorber catalyst (NAC). Emissions control devices where the catalyst composition is a $NO_x$ adsorber composition have been described (see, for example, EP 0766993). $NO_x$ adsorber compositions are well known in the art (see, for example, EP 0766993 and U.S. Pat. No. 5,473,887). $NO_x$ adsorber compositions are designed to adsorb NO from lean exhaust gas (lambda>1) and to desorb the $NO_x$ when the oxygen concentration in the exhaust gas is decreased. Desorbed $NO_x$ may then be reduced to $N_2$ with a suitable reductant (e.g. engine fuel) and promoted by a catalyst component, such as rhodium, of the $NO_x$ adsorber composition itself or located downstream of the $NO_x$ adsorber composition.

Generally, a $NO_x$ adsorber composition comprises an alkali metal component, an alkaline earth metal component or a rare earth metal component or a combination of two or more components thereof, wherein the rare earth metal component comprises lanthanum or yttrium. It is preferred that the alkali metal component comprises potassium or sodium, more preferably potassium. It is preferred that the alkaline earth metal component comprises barium or strontium, more preferably barium.

The $NO_x$ adsorber composition may further comprise a support material and/or a catalytic metal component. The support material may be selected from alumina, ceria, titania, zirconia and mixtures thereof. The catalytic metal component may comprise a metal selected from platinum (Pt), palladium (Pd), rhodium (Rh) and combinations of two or more thereof.

Lean $NO_x$ catalysts (LNCs) are well known in the art. Preferred lean $NO_x$ catalysts (LNC) comprises either (a) platinum (Pt) supported on alumina or (b) a copper exchanged zeolite, particularly copper exchanged ZSM-5.

SCR catalysts are also well known in the art. When the exhaust gas emission treatment system of the invention comprises an SCR catalyst, then the exhaust gas emission treatment system may further comprise an injector for injecting a nitrogenous reductant, such as ammonia or urea, into exhaust gas downstream of the catalyst for oxidising carbon monoxide (CO) and hydrocarbons (HCs) and upstream of the SCR catalyst. Alternatively or in addition to the injector, the exhaust gas emission treatment system may further comprise an engine management means for enriching the exhaust gas with hydrocarbons. The SCR catalyst can then use the hydrocarbons as a reductant to reduce $NO_x$. When the substrate of the SCR catalyst is a filtering monolith, then the catalyst is an SCRF catalyst. An SCRF catalyst is an emissions control device having a filtering substrate.

In a first exhaust gas emission treatment system embodiment, the exhaust gas emission treatment system comprises the catalytic convertor of the invention, preferably as a DOC, and a selective catalytic reduction (SCR) catalyst. Such an arrangement may be called a DOC/SCR. This embodiment also relates to the use of the catalytic convertor for treating an exhaust gas from a lean burn internal combustion engine in combination with a selective catalytic reduction filter (SCRF) catalyst, preferably wherein the catalytic convertor is, or is for use as, a diesel oxidation catalyst. The catalytic convertor of the invention is typically followed by (e.g. is upstream of) the selective catalytic reduction (SCR) catalyst. A nitrogenous reductant injector may be arranged between the catalytic convertor and the selective catalytic reduction (SCR) catalyst. Thus, the catalytic convertor may be followed by (e.g. is upstream of) a nitrogenous reductant injector, and the nitrogenous reductant injector may be followed by (e.g. is upstream of) the selective catalytic reduction (SCR) catalyst.

A second exhaust gas emission treatment system embodiment comprises the catalytic convertor of the invention, preferably as a DOC, and a selective catalytic reduction filter (SCRF) catalyst. Such an arrangement may be called a DOC/SCRF. This embodiment also relates to the use of the catalytic convertor for treating an exhaust gas from a lean burn internal combustion engine in combination with a selective catalytic reduction filter (SCRF) catalyst, preferably wherein the catalytic convertor is, or is for use as, a diesel oxidation catalyst. The catalytic convertor of the invention is typically followed by (e.g. is upstream of) the selective catalytic reduction filter (SCRF) catalyst. A nitrogenous reductant injector may be arranged between the catalytic convertor and the selective catalytic reduction filter (SCRF) catalyst. Thus, the catalytic convertor may be followed by (e.g. is upstream of) a nitrogenous reductant injector, and the nitrogenous reductant injector may be followed by (e.g. is upstream of) the selective catalytic reduction filter (SCRF) catalyst.

In a third exhaust gas emission treatment system embodiment, the exhaust gas emission treatment system comprises the catalytic convertor of the invention, preferably as a DOC, and either a diesel particulate filter (DPF) or a catalysed soot filter (CSF). Such an arrangement may be called a DOC/DPF or a DOC/CSF. This embodiment also relates to the use of the catalytic convertor for treating an exhaust gas from a lean burn internal combustion engine in combination with a diesel particulate filter or a catalysed soot filter, preferably wherein the catalytic convertor is, or is for use as, a diesel oxidation catalyst. The catalytic convertor is typically followed by (e.g. is upstream of) the diesel particulate filter or the catalysed soot filter (CSF). Thus, for example, an outlet of the catalytic convertor is connected to an inlet of the diesel particulate filter or the catalysed soot filter.

In a fourth exhaust gas emission treatment system embodiment, the exhaust gas emission treatment system comprises a diesel oxidation catalyst and the catalytic convertor of the invention, preferably as a catalysed soot filter (CSF). This arrangement may also be called a DOC/CSF arrangement. The embodiment further relates to the use of the catalytic convertor for treating an exhaust gas from a lean burn internal combustion engine in combination with a diesel oxidation catalyst (DOC), preferably wherein the oxidation catalyst is, or is for use as, a catalysed soot filter. Typically, the diesel oxidation catalyst (DOC) is followed by (e.g. is upstream of) the catalytic convertor of the invention. Thus, an outlet of the diesel oxidation catalyst is connected to an inlet of the catalytic convertor of the invention.

A fifth exhaust gas emission treatment system embodiment relates to an exhaust gas emission treatment system comprising the catalytic convertor of the invention, preferably as a DOC, a diesel particulate filter or a catalysed soot filter (CSF), and a selective catalytic reduction (SCR) catalyst. Such an arrangement may be called a DOC/DPF/SCR or a DOC/CSF/SCR and is a preferred exhaust gas emission treatment system for a light-duty diesel vehicle. This embodiment also relates to the use of the catalytic convertor for treating an exhaust gas from a lean burn internal combustion engine in combination with either a diesel particulate filter or a catalysed soot filter (CSF), and a selective catalytic reduction (SCR) catalyst, preferably wherein the catalytic convertor is, or is for use as, a diesel oxidation catalyst. The catalytic convertor is typically followed by (e.g. is upstream of) the diesel particulate filter or the catalysed soot filter (CSF). The DPF or CSF is typically followed by (e.g. is upstream of) the selective catalytic reduction (SCR) catalyst. A nitrogenous reductant injector may be arranged between the DPF or CSF and the selective catalytic reduction (SCR) catalyst. Thus, the DPF or CSF may be followed by (e.g. is upstream of) a nitrogenous reductant injector, and the nitrogenous reductant injector may be followed by (e.g. is upstream of) the selective catalytic reduction (SCR) catalyst.

A sixth exhaust gas emission treatment system embodiment relates to an exhaust gas emission treatment system comprising a diesel oxidation catalyst (DOC), the catalytic convertor of the invention, preferably as a catalysed soot filter (CSF), and a selective catalytic reduction (SCR) catalyst. This is also a DOC/CSF/SCR arrangement. A further aspect of this embodiment relates to the use of the catalytic convertor for treating an exhaust gas from a lean burn internal combustion engine in combination with a diesel oxidation catalyst (DOC) and a selective catalytic reduction (SCR) catalyst, preferably wherein the catalytic convertor is, or is for use as, a catalysed soot filter (CSF). The diesel oxidation catalyst (DOC) is typically followed by (e.g. is upstream of) the catalytic convertor of the invention. The catalytic convertor of the invention is typically followed by (e.g. is upstream of) the selective catalytic reduction (SCR) catalyst. A nitrogenous reductant injector may be arranged between the catalytic convertor and the selective catalytic reduction (SCR) catalyst. Thus, the catalytic convertor may be followed by (e.g. is upstream of) a nitrogenous reductant injector, and the nitrogenous reductant injector may be followed by (e.g. is upstream of) the selective catalytic reduction (SCR) catalyst.

In a seventh exhaust gas emission treatment system embodiment, the exhaust gas emission treatment system comprises the catalytic convertor of the invention, preferably as a DOC, a selective catalytic reduction (SCR) catalyst and either a catalysed soot filter (CSF) or a diesel particulate filter (DPF). The arrangement is either a DOC/SCR/CSF or a DOC/SCR/DPF. This embodiment also relates to the use of the catalytic convertor for treating an exhaust gas from a lean burn internal combustion engine in combination with a selective catalytic reduction (SCR) catalyst and either a catalysed soot filter (CSF) or a diesel particulate filter (DPF), preferably wherein the catalytic convertor is, or is for use as, a diesel oxidation catalyst.

In the seventh exhaust gas emission treatment system embodiment, the catalytic convertor of the invention is typically followed by (e.g. is upstream of) the selective catalytic reduction (SCR) catalyst. A nitrogenous reductant injector may be arranged between the catalytic convertor and the selective catalytic reduction (SCR) catalyst. Thus, the catalytic convertor may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

Lean burn refers to the use of lean combustion mixtures in both a gasoline and diesel (compression-ignition) fuel powered internal combustion engine. The engine fuel can also include at least some biodiesel, bioethanol, components derived from a gas-to-liquid process, liquid petroleum gas or natural gas. The engine may be used in a mobile application, such as a vehicle, or a stationary application, such as a power generation unit. Preferably use of the lean mixtures is in a diesel internal combustion engine (i.e. a diesel engine), more preferably a diesel internal combustion engine in a mobile application, especially in a vehicle. Vehicles include both light duty and heavy duty diesel for, for example cars, trains and boats, with a preference for light duty vehicles, more preferably passenger cars.

It is preferred that the lean burn internal combustion engine is a diesel engine.

Definitions

For the avoidance of doubt, where the mixed metal catalyst is disposed on a support it is described as being "supported".

Any reference to "unalloyed palladium" as used herein typically refers to palladium metal or palladium oxide. The "unalloyed palladium" is to separate to (i.e. is not part of) the palladium-gold alloy. Typically, unalloyed palladium is present as palladium oxide.

The term "mixed oxide" as used herein generally refers to a mixture of oxides in a single phase, as is conventionally known in the art.

The term "composite oxide" as used herein generally refers to a composition of oxides having more than one phase, as is conventionally known in the art. Typically, the "composite oxide" is a largely amorphous oxide material comprising oxides of at least two elements which are not true mixed oxides consisting of the at least two elements.

The term "washcoat" is well known in the art and refers to an adherent coating that is applied to a substrate monolith usually during production of a catalytic convertor. The coating or washcoat generally comprises one or more components of a catalyst composition.

The term "washcoat region" as used herein refers to an area of washcoat on a substrate monolith. A "washcoat region" can, for example, be disposed or supported on a substrate monolith as a "layer" or a "zone". The area or arrangement of a washcoat on a substrate monolith is generally controlled during the process of applying the washcoat to the substrate monolith. The "washcoat region" typically has distinct boundaries or edges (i.e. it is possible to distinguish one washcoat region from another washcoat region using conventional analytical techniques).

The term "zone" as used herein refers to a washcoat region of substantially uniform length. The length of a zone may be the same as the total length of the substrate monolith. In general, the length of a zone is less than the total length of the substrate monolith.

EXAMPLES

The present invention will now be described by way of illustration in the following Examples with reference to the accompanying drawings.

Example 1

Preparation of Fresh Catalyst Compositions 40 g $CeO_2$ was slurried in 1600 ml water and warmed to 55° C. for 15 minutes.

1.3284 g Pd nitrate was dissolved in 20 ml water. 1.6157 g Hydrogen tetrachloroaurate was dissolved in 20 ml demineralised water. These were added into the stirred oxide slurry together with about 150 ml 0.05 M $K_2CO_3$ at variable rate to keep the pH range between 6-8. When the addition was complete, the slurry was stirred at 55° C. for 1 hr whilst maintaining the pH range between 6-8. The catalyst composition was collected by filtration and washed on the filter bed until the conductivity was less than 5 μS. The catalyst composition (0.5Pd 2Au supported on $CeO_2$ which is also acting as promoter) was left on the filter paper inside the funnel to dry and then further dried overnight at 105° C.

Catalyst compositions prepared according to the invention are detailed in Table 1. In each case the reducible metal oxide promoter is ceria which also acts as support.

TABLE 1

| Catalyst | Composition wt % Pd—Au | Atomic Ratio Pd:Au |
|---|---|---|
| Pd—Au—$CeO_2$ | 1.0-1.0 | ~65:35 |
| Pd—Au—$CeO_2$ | 0.5-2.0 | ~32:68 |
| Pd—Au—$CeO_2$ | 2.0-0.5 | ~88:12 |

Example 2

Preparation of Reference/Comparative Catalysts

Pt—CeO2 Prepared by Co-precipitation Method 50 g of Pt—$CeO_2$ with a nominal loading of 0.9 wt % Pt was prepared using $Ce(NO_3)_3 \cdot 6H_2O$ (126 g), chloroplatinic acid (CPA) (1.148 g) and solid NaOH (36 g). The NaOH was dissolved in 6 litres of de-ionised water and brought to the boil. The CPA and $Ce(NO)_3$ were dissolved in water and made up to 500 cm$^3$. The resulting solution was added drop-wise to the boiling NaOH solution and produced a black precipitate. The precipitate was then boiled for an hour, filtered and washed to remove $NO_3^-$, $Cl^-$ and $Na^+$. The washed precipitate was dried at 110° C. and then calcined in air at 500° C.

Preparation of Ceria ($CeO_2$)

Ceria was prepared using $Ce(NO_3)_3 \cdot 6H_2O$ (126 g) and solid NaOH (36 g). The NaOH was dissolved in 6 litres of de-ionised water and brought to the boil. The $Ce(NO)_3$ was dissolved in water and made up to 500 cm$^3$. The resulting solution was added drop-wise to the boiling NaOH solution to provide a greyish white precipitate. The precipitate was then boiled for an hour, filtered and washed to remove $NO_3^-$ and $Na^+$. The washed precipitate was dried at 110° C. and then calcined in air at 500° C.

Preparation of Fresh Pt-Ceria by Impregnation (Pt-Ceria(Impreg))

3.1892 g Pt nitrate was diluted with approximately 5 ml demineralised water. The mixture was added in one step to 50 g of the $CeO_2$ obtained by the method described hereinabove. The Pt/$CeO_2$ was dried in an air oven overnight and then calcined at 500° C. for 2 hr.

Preparation of Fresh Pd—$CeO_2$ by Incipient Wetness Impregnation 0.26588 g Pd nitrate was diluted with approximately 5 ml of demineralised water. The mixture was added stepwise to 20 g $CeO_2$ obtained by the method described hereinabove. The 2Pd—$CeO_2$ was dried in oven at 105° C. for a few hours then calcined at 500° C. for 2 hr.

Preparation of Fresh Au—$CeO_2$ by Deposition/Precipitation 20 g $CeO_2$ obtained by the method described hereinabove was slurried in 800 ml water and warmed to 55° C. for 15 minutes. 1.0137 g $HAuCl_4$ solution added into the stirred oxide slurry together with $K_2CO_3$ at variable rate to keep the pH range between 6-8. The slurry was stirred at 55° C. for 1 hr maintaining the pH range between 6-8. The catalyst was collected by filtration and washed on the filter bed until the conductivity was less than 5 μS. The catalyst was dried overnight at 105° C. and calcined at 500° C. for 2 hr.

Preparation of Pt—Pd—$CeO_2$ by Impregnation 1.065 g Pd Nitrate was mixed with 2.167 g Pt Nitrate and 0.3440 g Citric Acid using ~10 ml of demineralised water, until compete dissolution. The mixture was added stepwise to the $CeO_2$ support obtained by the method described hereinabove. The Pt—Pd—$CeO_2$ was oven dried at 105° C. for few hours then calcined at 500° C. for 2 hr.

2Pd—$Al_2O_3$ Prepared by Impregnation 9.64 g Pd nitrate was diluted in 5 mL demineralised $H_2O$. The mixture was added drop-wise to 40 g $Al_2O_3$. The 2Pd—$Al_2O_3$ was oven dried at 105° C. for a few hours then calcined at 500° C. for 2 hr.

2Au-0.5Pd—$Al_2O_3$ Prepared by Deposition Precipitation 20 g Alumina was slurried in 800 ml water and warmed to 55° C. for 15 minutes. 1.2165 g Pd nitrate was mixed with 0.8 g $HAuCl_4$ solution with minimum addition of water and added into the stirred oxide slurry together with $K_2CO_3$ at variable rate to keep the pH range between 6-8. The slurry was stirred at 55° C. for 1 hr maintaining the pH range between 6-8. The catalyst was collected by filtration and washed on the filter bed until the conductivity was less than 5 µS, dried overnight at 105° C. and calcined at 500° C. for 2 hr.

0.5Au-2Pd—$Al_2O_3$ Prepared by Deposition Precipitation 20 g Alumina was slurried in 800 ml water and warmed to 55° C. for 15 minutes. 4.8148 g Pd nitrate was mixed with 0.2036 g $HAuCl_4$ solution with minimum addition of water and added into the stirred oxide slurry together with $K_2CO_3$ at variable rate to keep the pH range between 6-8. When the addition was complete, the slurry was stirred at 55° C. for 1 hr maintaining the pH range between 6-8. The catalyst was collected by filtration and washed on the filter bed until the conductivity was less than 5 µS dried overnight at 105° C. and calcined at 500° C. for 2 hr.

Example 3

Ageing

"Fresh" catalyst compositions were prepared by calcining in air at 500° C. for 2 hr (see Example 2 hereinabove). High temperature aged catalysts were prepared by taking the fresh catalyst and heating it in air at 600° C. for 2 hr or at 750° C. for 10 hrs. Aged or fresh catalysts are described as "clean" when they have not been exposed to sulphur, or "sulphated" when they have, or "desulphated" when sulphated catalyst has been exposed to higher temperature gas stream including additional hydrocarbon, which is intended to remove sulphur species adsorbed thereon.

Example 4

Testing Conditions

Catalyst compositions were tested in a simulated catalyst activity testing (SCAT) gas apparatus using the inlet gas mixtures in Table 2.

TABLE 2

| Exhaust Gas Composition | Tables 3 & 5 below | Table 4 below | Tables 6 and 7 below |
|---|---|---|---|
| ppm CO | 1000 | 1000 or 2000 | 1500 |
| ppm HC | 900 as propene | 900 | 40 as propene; 50 as decane. |
| ppm $NO_x$ | 200 | 200 | 100 |
| % $CO_2$ | 4.5 | 5 | 5 |
| % $H_2O$ | 4.5 | 5 | 5 |
| % $O_2$ | 12 | 12 | 14 |

In each case the balance is nitrogen.

Example 5

Repeated Sulphation and Desulphation

Figure 3:
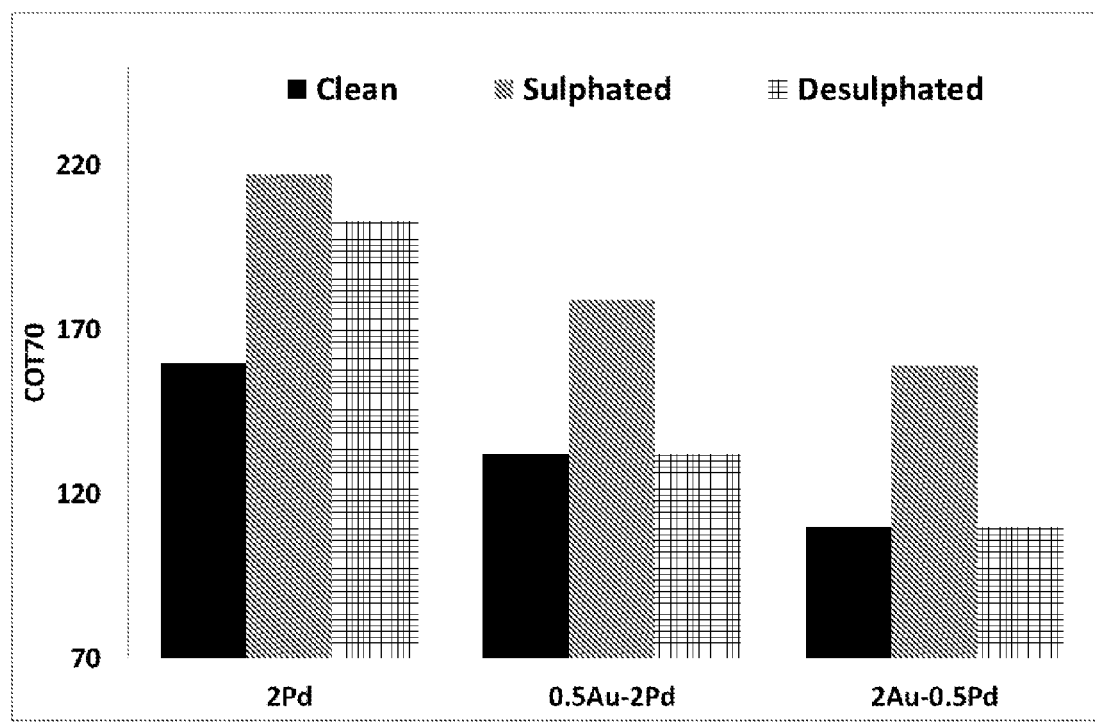
FIG. 3 is a chart showing the temperature at which 70% CO conversion occurs plotted for a range of catalyst compositions according to the invention and a reference catalyst composition with the promoter of the invention and with a reference support which have been subjected to sulphation and desulphation.

2Pd-0.5Au—$CeO_2$ according to the invention, and comparative Pd—$CeO_2$ were aged as per Example 3 (750° C. for 10 hrs). They were then subjected to sulphur ageing by exposure, using the SCAT gas apparatus, to $SO_2$ at a concentration sufficient to provide about 10 mgS/g catalyst and a temperature of 300° C. The sulphur-aged catalyst was then desulphated in the gas mixture of Table 3 at higher temperature and with additional HC injection. The sulphation/desulphation process was then repeated. The results are shown in FIG. 3.

Example 6

Results of Catalyst Testing

Table 3 below shows temperatures for conversion of 80% CO and 50% HC for fresh catalyst prepared according to the invention in Example 1 and comparative fresh catalysts prepared according to Example 2 tested in SCAT gas apparatus as described in Example 4.

TABLE 3

| Catalyst | Temperature for 80% CO conversion (° C.) | Temperature for 50% HC conversion (° C.) |
|---|---|---|
| 2Pd—0.5Au—$CeO_2$ | 138 | 169 |
| Comparative Pd—$CeO_2$ (wetness/impregnation) | 168 | 177 |
| Comparative Pt—$CeO_2$ (co-precipitation) | 188 | 210 |
| Comparative Pt—$CeO_2$ (impregnation) | 261 | 262 |

Table 3 clearly shows that the fresh catalyst according to the invention provides a lower light off temperature at both 80% CO and 50% HC conversion as compared to the comparative fresh catalysts.

Table 4 below shows the temperatures for 80% conversion of CO and 50% conversion of HC in the presence of high concentrations of CO for fresh catalyst prepared according to the invention and comparative fresh catalysts tested in SCAT gas apparatus as described in Example 4.

TABLE 4

| Catalyst | CO concentration (ppm) | Temperature for 80% CO conversion (° C.) | Temperature for 50% HC conversion (° C.) |
|---|---|---|---|
| 2Pd—0.5Au—$CeO_2$ | 1000 | 139 | 169 |
| 2Pd—0.5Au—$CeO_2$ | 2000 | 135 | 159 |
| Comparative 2Pd—$CeO_2$ | 1000 | 167 | 178 |
| Comparative 2Pd—$CeO_2$ | 2000 | 161 | 150 |

Table 4 clearly shows that the fresh catalyst according to the invention provides a lower light off temperature for 80% CO conversion as compared to the comparative fresh catalysts in the presence of a higher concentration of CO. Furthermore the light off temperatures for both HC and CO reduces as the concentration of CO is increased.

Table 5 below shows temperatures for 80% conversion of CO for fresh and aged catalyst compositions prepared according to the invention and comparative fresh and aged catalyst compositions, aged as described in Example 3, tested in SCAT gas apparatus as described in Example 4.

TABLE 5

| Catalyst | Temperature for 80% CO conversion (° C.) | |
| --- | --- | --- |
| | Fresh (calcined at 500° C. for 2 hr) | Aged (calcined at 600° C. for 2 hr) |
| 2Pd—0.5Au—CeO$_2$ | 136 | 138 |
| Comparative Pt—0.5Au (co-precipitation) | 160 | 223 |
| Comparative Pt—CeO$_2$ (co-precipitation) | 188 | 228 |

Table 5 clearly shows that the aged catalyst composition according to the invention is thermally stable and capable of maintaining the low light off temperatures for both 80% conversion of CO. Furthermore for the cases of the comparative fresh and aged catalyst compositions the aged comparative catalyst compositions are shown to be considerably less stable than their fresh counterparts.

Table 6 below shows temperatures for 80% conversion of CO and 50% conversion of HC for aged catalyst compositions prepared according to the invention and comparative aged catalyst compositions, aged as described in Example 3 for 10 hrs at 750° C., tested in SCAT gas apparatus as described in Example 4, in the presence of a mixture of hydrocarbons.

TABLE 6

| | Mixture of 2HC | |
| --- | --- | --- |
| Catalyst | Temperature for conversion of 80% CO (° C.) | Temperature for conversion of 50% HC (° C.) |
| 2Pd—0.5Au—CeO$_2$ | 138 | 155 |
| Comparative 2Pd—CeO$_2$ | 153 | 158 |

The mixture of hydrocarbons has been chosen to simulate engine testing conditions. For both hydrocarbon mixtures there is an improvement in the low light off temperature for both CO and HC for the thermally aged catalyst of the invention as compared to the comparative catalyst.

FIG. 1 is a chart which shows how the temperature for conversion of 80% CO varies after thermal ageing at 750° C. for 10 hrs for catalyst compositions prepared according to the invention i.e. 2Pd—0.5Au—CeO$_2$ and 0.5Pd—2Au—CeO$_2$ and comparative catalyst compositions i.e. Au—CeO$_2$, Pd—CeO$_2$, Pt—Pd—CeO$_2$, and Pt—CeO$_2$ (impregnated), relative to fresh samples of the same catalysts, i.e. calcined at 500° C. for 2 hrs.

FIG. 1 clearly shows that catalyst compositions according to the invention have enhanced thermal stability as compared to comparative catalyst compositions.

Figure 2:
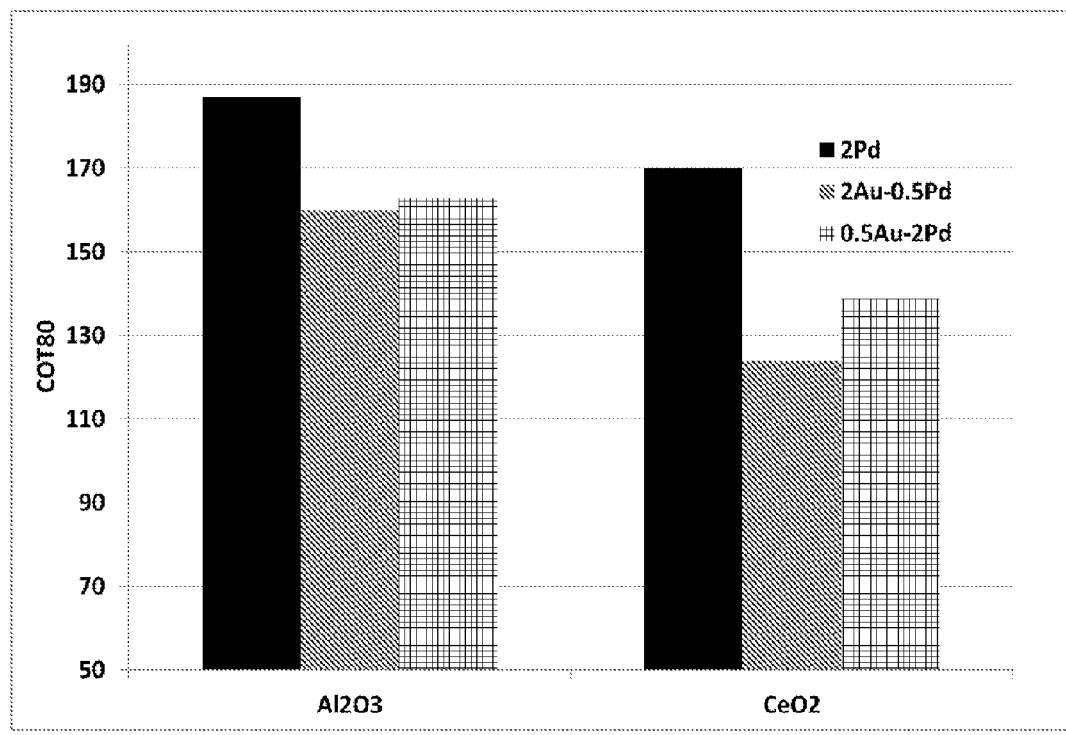
FIG. 2 is a chart showing the temperature at which 50% CO conversion occurs plotted for a range of catalyst compositions according to the invention and a reference catalyst composition with the promoter of the invention and with a reference support which have been subjected to thermal ageing over a sustained period.

FIG. 2 is a chart which shows how the temperature for conversion of 50% CO varies when the catalyst composition has been subjected to sustained calcination for 10 hours at 750° C. for catalyst compositions prepared according to the invention i.e. 2Pd-0.5Au—CeO$_2$ and 0.5Pd-2Au—CeO$_2$ and comparative catalyst compositions i.e. Pd—Al$_2$O$_3$, 2Au-0.5Pd—Al$_2$O$_3$, 0.5Au-2Pd—Al$_2$O$_3$.

FIG. 2 clearly shows that the catalyst composition according to the invention where the promoter is ceria has higher activity due to the combined effect of the Au—Pd interaction with the ceria as compared to the alumina.

FIG. 3 is a chart which shows how the temperature for conversion of 70% CO varies when the catalyst composition is clean and after sulphation at 300° C. and high temperature desulphation for catalyst compositions prepared according to the invention i.e. 2Pd-0.5Au—CeO$_2$ and 0.5Pd-2Au—CeO$_2$ and comparative catalyst compositions i.e. 2Pd—CeO$_2$.

FIG. 3 clearly shows that the catalyst composition according to the invention where the Au is coupled to Pd that the Pd—Au alloy enriched in Au has enhanced sulphur tolerance and is less affected by the high temperature desulphation process compared to the metal, i.e. Pd, alone.

In conclusion, collectively the results show that the catalyst composition of the invention provides lower light off temperatures for both CO and HC conversion as compared to known catalyst compositions in the art. Furthermore the catalyst activity is maintained in the presence of high CO levels, i.e. at engine start up, the catalyst composition is thermally stable and can be readily sulphated and desulphated without significantly compromising its catalytic activity.

For the avoidance of any doubt, the entire contents of any and all prior art documents cited herein are incorporated herein by reference.

The invention claimed is:

1. A catalytic convertor comprising a substrate comprising a substrate monolith coated with a catalyst composition comprising a mixed metal catalyst supported on a support, wherein the mixed metal catalyst comprises unalloyed palladium and palladium-gold alloy disposed on the support, and at least one promoter, wherein the palladium-gold alloy is enriched in gold, the at least one promoter comprises at least one reducible metal oxide, wherein the at least one reducible metal oxide is at least one oxide of manganese, iron, tin, copper, cobalt, titanium and cerium, and wherein the support is particulate ceria or a mixed oxide or composite oxide of particulate ceria with alumina.

2. A catalytic convertor according to claim 1, wherein the atomic ratio of Pd:Au in the mixed metal catalyst is from 100:1 to 1:100.

3. A catalytic convertor according to claim 1, wherein the weight ratio of Pd:Au in the mixed metal catalyst is >1:1.

4. A catalytic convertor according to claim 1, wherein the amount of palladium and gold in the mixed metal catalyst is from 0.5-10 wt %.

5. A catalytic convertor according to claim 1, wherein the at least one reducible metal oxide is at least one oxide of iron and cerium.

6. A catalytic convertor according to claim 5, wherein the at least one reducible metal oxide is ceria.

7. A catalytic convertor according to claim 1, wherein the promoter and support is ceria.

8. A catalytic convertor according to claim 1, wherein the promoter and support is a mixed oxide or composite oxide of particulate ceria with alumina.

9. A catalytic convertor according to claim 1, further comprising platinum located on a separate and distinct metal oxide support to the mixed metal catalyst.

10. A catalytic convertor according to claim 9, wherein the separate and distinct metal oxide support also contains palladium.

11. A catalytic convertor according to claim 9, wherein the mixed metal catalyst is on the at least one reducible metal oxide acting as both the at least one promoter and the support; the platinum is on the separate and distinct metal oxide support to the mixed metal catalyst; and both the mixed metal catalyst and the platinum are disposed in the same washcoat layer.

12. A catalytic convertor according to claim 9, wherein the platinum on the separate and distinct metal oxide support is disposed in a layer under an overlayer comprising the supported mixed metal catalyst with the at least one promoter.

13. A catalytic convertor according to claim 1, wherein the substrate monolith is a honeycomb flow-through monolith or a filter.

14. A catalytic convertor according to claim 1, wherein the at least one reducible oxide is combined with a stabilizer or combined in a composite or mixed oxide with a refractory oxide.

15. A catalytic convertor according to claim 14, wherein the at least one reducible oxide is a mixed oxide selected from manganese oxide with zirconium and ceria with zirconium.

16. A lean burn internal combustion engine exhaust gas emission treatment system comprising a catalytic convertor according to claim 1.

17. An apparatus comprising a lean burn internal combustion engine and a lean burn internal combustion engine gas emission treatment system according to claim 16.

18. A vehicle comprising an apparatus according to claim 17.

* * * * *